United States Patent
Määttä et al.

(10) Patent No.: US 9,248,622 B2
(45) Date of Patent: Feb. 2, 2016

(54) METHOD FOR SEALING A FIBER-BASED MATERIAL

(75) Inventors: Päivi Määttä, Imatra (FI); Petri Laakso, Lappeenranta (FI); Jari Hovikorpi, Kotka (FI); Risto Vesanto, Imatra (FI)

(73) Assignee: STORA ENSO OYJ, Helsinki (FI)

( * ) Notice: Subject to any disclaimer, the term of this patent is extended or adjusted under 35 U.S.C. 154(b) by 1220 days.

(21) Appl. No.: 10/587,217

(22) PCT Filed: Feb. 24, 2005

(86) PCT No.: PCT/FI2005/000118
§ 371 (c)(1),
(2), (4) Date: Jun. 4, 2007

(87) PCT Pub. No.: WO2005/080207
PCT Pub. Date: Sep. 1, 2005

(65) Prior Publication Data
US 2007/0295445 A1    Dec. 27, 2007

(30) Foreign Application Priority Data
Feb. 25, 2004   (FI) .................................. 20040290

(51) Int. Cl.
*B29C 65/16* (2006.01)
*B31B 1/64* (2006.01)
(Continued)

(52) U.S. Cl.
CPC ................ *B31B 1/64* (2013.01); *B29C 65/168* (2013.01); *B29C 65/1635* (2013.01);
(Continued)

(58) Field of Classification Search
CPC .. B29C 65/16; B29C 65/168; B29C 65/1683; B29C 65/1635; B29C 65/1677; B29C 66/431; B29C 66/4312; B29C 66/43121; B29C 66/43122; B29C 66/43123; B29C 66/7232; B29C 66/72328

USPC ............... 156/272.2, 272.8; 999/272.2, 272.8
See application file for complete search history.

(56) References Cited

U.S. PATENT DOCUMENTS 3,574,031 A     4/1971  Heller, Jr. et al.
4,537,809 A  *  8/1985  Ang et al. .................... 428/42.2
(Continued)

FOREIGN PATENT DOCUMENTS

DE          195 16 726 A1    11/1996
DE          19516726 A1   *  11/1996
(Continued)

OTHER PUBLICATIONS

Machine Translation of DE 19516726 A1, Nov. 1996.*
(Continued)

*Primary Examiner* — Daniel McNally
(74) *Attorney, Agent, or Firm* — Birch, Stewart, Kolasch & Birch, LLP

(57) ABSTRACT

The invention relates to a method for sealing a fiber-based material (1, 4) to a counter-surface to be bonded to it by melting polymer present at the sealing point. In accordance with the invention, the sealing is performed by directing a laser beam (8) through the fiber layer (4) of the material to a radiation-absorbing pigment disposed in the sealing area (9), with the absorption heat melting the polymer (5) and generating the sealing. The method allows sealing of plastic-coated paper or board to itself, to another plastic counter-surface or also to paper or board without any plastic coating. It is also possible to seal uncoated paper or board to paper or board containing plastic, such as plastic-coated paper or board, or to a plastic film. The absorptive pigment, e.g. carbon black, may be admixed in the plastic coating of the board or paper or the plastic film formed on the counter-surface, or the pigment may be located on the surface of the material to be sealed or its fiber layer, or on the counter-surface to which the material is sealed, e.g. as a component of printing ink applied to the counter-surface.

11 Claims, 4 Drawing Sheets

Figure 1:
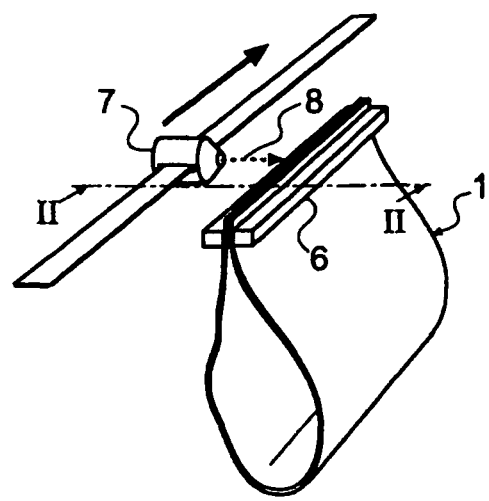

(51) Int. Cl.
*B29C 65/00* (2006.01)
*B29K 711/12* (2006.01)
*B29L 9/00* (2006.01)

(52) U.S. Cl.
CPC ........ *B29C 65/1654* (2013.01); *B29C 65/1658* (2013.01); *B29C 65/1677* (2013.01); *B29C 65/1683* (2013.01); *B29C 66/1122* (2013.01); *B29C 66/43* (2013.01); *B29C 66/431* (2013.01); *B29C 66/4322* (2013.01); *B29C 66/723* (2013.01); *B29C 66/836* (2013.01); *B29C 65/1616* (2013.01); *B29C 65/1619* (2013.01); *B29C 65/1674* (2013.01); *B29C 66/43121* (2013.01); *B29C 66/72328* (2013.01); *B29K 2711/12* (2013.01); *B29K 2711/123* (2013.01); *B29L 2009/00* (2013.01); *B29L 2009/005* (2013.01); *B31B 2201/6026* (2013.01)

(56) References Cited

U.S. PATENT DOCUMENTS

| | | | |
|---|---|---|---|
| 4,540,392 A | | 9/1985 | Junod et al. |
| 4,898,752 A | * | 2/1990 | Cavagna et al. ............ 427/265 |
| 5,192,559 A | * | 3/1993 | Hull et al. .................... 425/89 |
| 5,614,339 A | * | 3/1997 | Tankovich .................... 430/19 |
| 5,690,775 A | | 11/1997 | Calvert et al. |
| 6,200,644 B1 | * | 3/2001 | Ulfstedt et al. ............... 427/487 |
| 2003/0003296 A1 | * | 1/2003 | Dries et al. .................... 428/336 |
| 2003/0150543 A1 | * | 8/2003 | Hartley et al. ................. 156/64 |

FOREIGN PATENT DOCUMENTS

| | | | |
|---|---|---|---|
| DE | 199 25 203 A1 | | 4/2004 |
| JP | 03113353 A | * | 5/1991 |
| JP | 7-156907 A | | 6/1995 |
| JP | 9-188357 A | | 7/1997 |
| JP | 10-287361 A | | 10/1998 |
| JP | 2000-109028 A | | 4/2000 |
| JP | 2002/67164 A | | 3/2002 |
| JP | 2004-537480 A | | 12/2004 |
| WO | WO-99/51421 A1 | | 10/1999 |
| WO | WO-00/20157 A1 | | 4/2000 |
| WO | WO-01/76976 A1 | | 10/2001 |
| WO | WO-02/00144 A1 | | 1/2002 |
| WO | WO 03/013976 A1 | | 2/2003 |
| WO | WO-2004/007195 A1 | | 1/2004 |
| WO | WO-2004/037649 A1 | | 5/2004 |

OTHER PUBLICATIONS

Office Action from Japanese Patent Applicantion No. 2007-500238, dated Jun. 1, 2010.
Japanese Office Action issued on Nov. 30, 2010 in corresponding Japanese Patent Application No. 2007-500238.
Ojala, "Studies on infrared drying of paper, use of integrating spheres in FTIR measurements, and heat and mass transfer inside paper," Helsinki University of Technology, Sep. 1993 (145 pages).

* cited by examiner

METHOD FOR SEALING A FIBER-BASED MATERIAL

This invention relates to a method for sealing a fibre-based material to a counter-surface to be bonded to the material by melting polymer present at the sealing point.

Heat sealing is a commonly used technique in bonding polymer-coated fibre-based materials, such as coated papers and boards. The sealing may be performed by pressing the surfaces to be sealed between heatable sealing elements, so that the heat melts the coating plastic, thus causing the surfaces to seal together, or a coating plastic can be melted by hot-air blowing before the surfaces to be sealed are joined. These heat-sealing techniques are widely used in the packaging technology for the manufacture of bags, containers, casings and boxes and in techniques for closing product packages.

It is also previously known to seal plastic-coated paper or board by means of a laser beam that melts polymer. Such sealing methods have been depicted i.a. in EP 1069984 B1, U.S. Pat. No. 4,540,392 and U.S. Pat. No. 5,690,775. The laser beam is directed to the plastic coating of the paper or board, and then the surfaces to be sealed are pressed against each other, the molten plastic bonding the surfaces to each other at the sealing point when cooling and solidifying.

Laser sealing has principally been performed by means of a $CO_2$ laser, the polymers used in the coatings and films absorbing the wavelength generated by this so that the beam immediately melts the polymers when hitting them. However, WO 02/00144 discloses a laser-sealing method for plastic films that is based on the use of a pigment that absorbs radiation and is heated under the effect of the absorption heat. This publication uses Nd:YAG or diode laser as the laser source, the wavelengths of these penetrating through the plastic layers without being absorbed. The method aims at directing the sealing to the interfaces between plastic films placed on top of each other, without the films melting, with consequent fusion to each other over their entire thickness. The pigment heated under the effect of the beam and melting the surrounding polymer may be disposed at the interface between the plastic films, or the sealed film may be totally dispersed with absorbing pigment.

In known methods for sealing polymer-coated paper or board using $CO_2$ laser, the laser beam is directed to the coating from an opposite laser source. It has not been possible to use a method in which the laser beam melting the polymer would be brought to the seal point through the fibre layer of the paper or board, because the laser beam would burn the paper or board. As far as the applicant knows, this is the reason why laser sealing has not been applied to the sealing of coated papers or boards that have been previously placed facing each other, but one has only used a process, in which the coating is first melted with laser and the surfaces are subsequently pressed against each other in order to bond them to each other.

The purpose of the present invention is thus to find a solution to the problem mentioned above, by means of which a fibre-based material, such as paper or board, could be sealed by a laser beam in a situation where the surfaces to be sealed have been disposed adjacent each other before the laser beam is directed to them. The solution of the invention is characterised by the sealing taking place with the laser beam directed through the fibrous layer of the material to a radiation-absorbing pigment disposed in the sealing area, so that the absorption heat melts the polymer present at the sealing point and thus produces the sealing.

The invention is based on the inventors' findings regarding the effects of laser radiation on fibre materials, such as paper or board. As mentioned above, $CO_2$ laser that melts and seals polymers is known to burn paper or board, and this process has been utilised for making identifying marks in these, among other things. Diode, Nd:YAG or fibre laser can generate wavelengths that do not burn paper, but then strong radiation scattering will occur in the fibre layer. Laser beams acting in the wavelength range 500-1,500 nm are suitable. According to the prevailing idea, the laser beam cannot be directed through a fibre material such as paper or board. The measurements conducted by the inventors also confirmed the scattering of the radiation; a measurement sensor placed opposite the laser source on the opposite side of the fibre layer detected low radiation intensities, which were but a fraction of the original ones.

Despite the facts above, the trials led to the following unexpected observation: when the laser beam was directed to a board that had been coated with a polymer layer containing an absorbing pigment on the side opposite to the incidence direction of the beam, the radiation resulted in melting of the coating layer. This observation was made both with a diode and an Nd:YAG laser, which do not have an effect that burns the fibre layer or melts the polymer directly, i.e. without the contribution of the pigment.

It has further been observed in connection with the invention that the pigment does not necessarily have to be in direct contact with the fibre layer, but the laser beam reaches it also through a transparent polymer layer placed adjacent the fibre layer, and also that the melting effect of the pigment reaches the adjacent transparent polymer layer, so that this layer becomes sealable also on its side opposite to the pigment.

Owing to the premises above, the invention offers the possibility of numerous different applications. The pigment may be included in the fibre-based material to be sealed, or optionally, the pigment may be contained in a member to which the fibre-based material is sealed. The pigment may be dispersed in the polymer coating of the fibre-based material or in a polymer film to which the fibre-based material is sealed. Optionally, the pigment may be disposed on the surface of the material to be sealed or a material layer of this, and then the pigment can also be interposed between the material layers, e.g. adjacent the fibre layer under the transparent polymer layer.

We may cite as an example of preferred application objects of the invention the sealing of a packaging board coated with a grey-pigmented polymer layer to a counter-surface, e.g. to itself. Such packaging boards, whose polymer coating imitates an aluminium foil, have been described in WO patent specification 01/76976 and FI patent application 20021359. The light-shielding grey coating layer is disposed on the inner surface of the board in the product packages, the invention allowing closing of the packages by sealing, with the laser beam melting the pigmented polymer layer being directed to the seal point through the board from the outside of the package. In addition to ordinary linear seals, we may mention another object of application comprising shaped seals, such as e.g. the seals of the lids of yoghurt containers.

Figure 2:
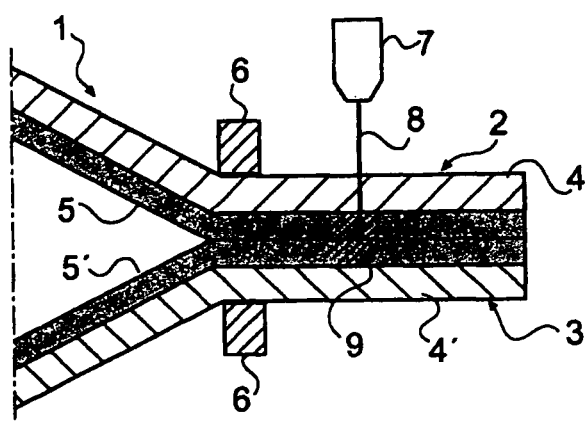
Figure 4:
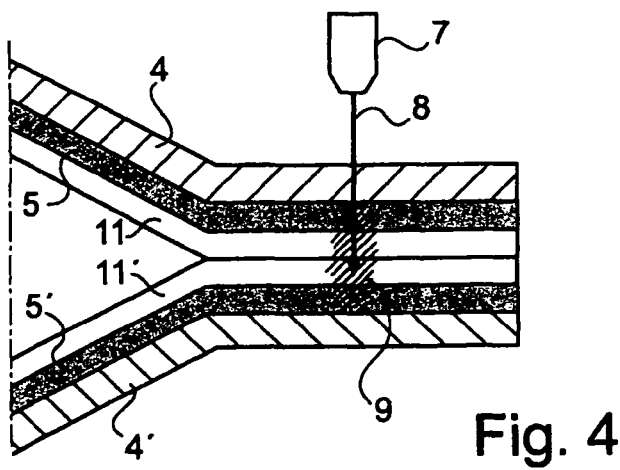
Figure 5:
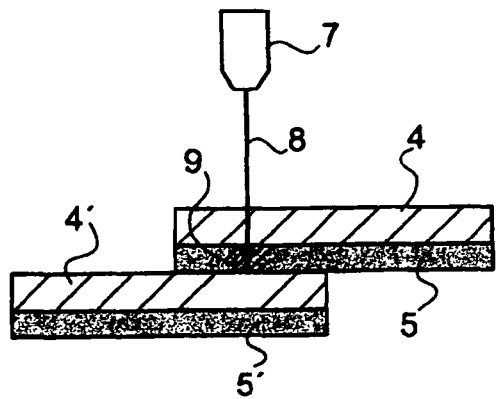
Figure 6:
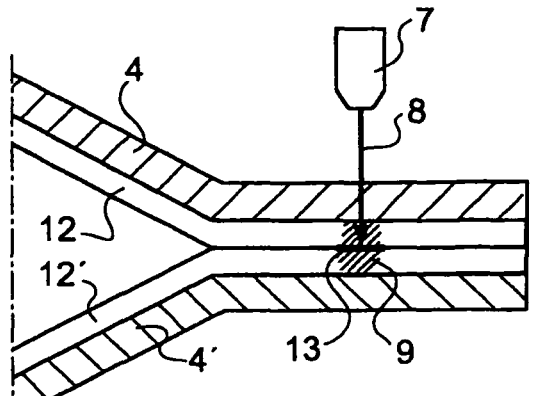
Figure 7:
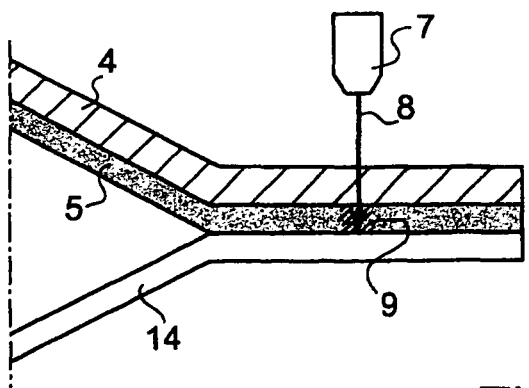
Figure 8:
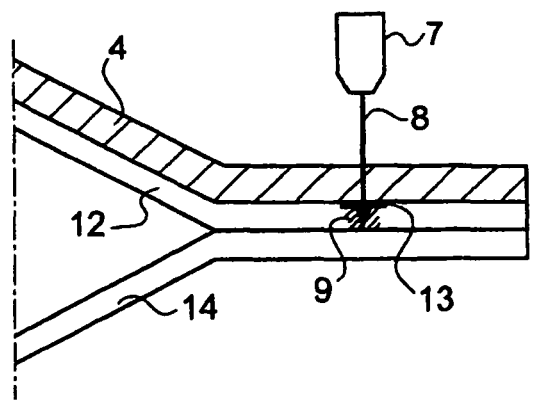
Figure 9:
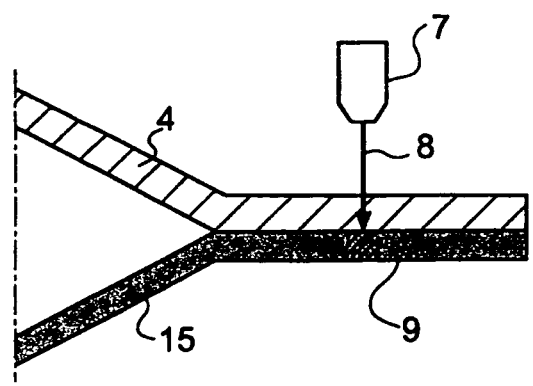
Figure 10:
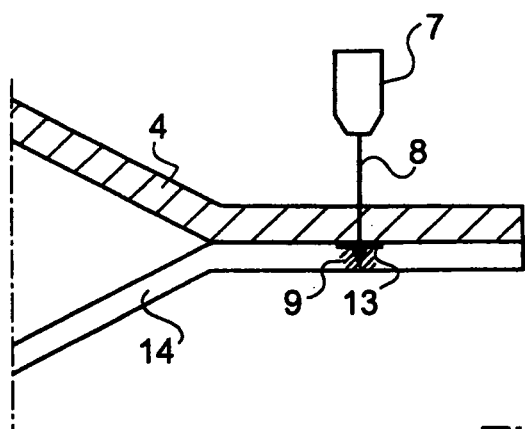

The invention is explained in greater detail below with the aid of examples and with reference to the accompanying drawings, in which FIG. 1 illustrates the sealing of a plastic-coated board sheet of the invention in tubular shape, FIG. 2, which is a cross-sectional view II-II of FIG. 1, shows a seal point, at which the pigmented plastic coating layers of the board are located opposite each other, FIG. 3 corresponds to FIG. 2, except that the plastic coating of the board consists of an inner transparent layer and an outer pigmented layer, FIG. 4 corresponds to FIG. 2, except that the plastic coating of the board consists of an inner pigmented layer and an outer transparent layer, FIG. 5 shows the sealing of the board of FIG. 2 equipped with a pigmented plastic coating, in which the edges of the board to be sealed together are disposed in overlapping relationship, FIG. 6 corresponding to FIG. 2 illustrates the sealing of a board equipped with a transparent plastic coating by means of an absorbing pigment applied onto the coating, FIG. 7 illustrates the sealing of a board equipped with a pigmented plastic coating to a transparent plastic film, FIG. 8 illustrates the sealing of a board equipped with a pigmented plastic coating to a transparent plastic film by means of an absorbing pigment interposed between the board and the plastic coating, FIG. 9 illustrates the sealing of an uncoated board to a pigmented plastic film, and FIG. 10 illustrates the sealing of an uncoated board to a transparent plastic film by means of an absorbing pigment disposed at the sealing point.

FIGS. 1 and 2 are schematic views of the sealing of a double-folded sheet 1 of plastic-coated board into a tubular shape. The opposite edges 2, 3 of the sheet 1 are brought facing each other with the plastic coating layers 5, 5' of the board 4, 4' adjacent each other and pressed between elongated holders 6 in order to retain the sheet in position during the sealing. The sealing takes place by means of a laser head 7 moving in alignment with the holders 6, the laser head being e.g. a diode laser generating a 940 nm wavelength. The laser head 7 directs a laser beam 8 to the seal point 9 from the side of the joined edge portions of the sheet 1, the sealing being performed by moving the laser head from one end to the other of the sealing line in the direction of the arrow in FIG. 1.

The sealing of the invention is based on the effect of the pigment disposed at the seal point 9, resulting in radiation absorption and fusion of the coating plastic. In the embodiment illustrated in FIG. 2, the plastic coating 5 of the board, constituting the inner surface of the tube thus formed, contains absorptive pigment evenly dispersed, such as e.g. carbon black. When board is sealed for package applications, pigmenting of the plastic coating may provide a light shield for the packaged product, and by combining black and white pigment, such as e.g. carbon black and titanium dioxide, the coating can be imparted a grey colour shade similar to that of an aluminium foil. The laser beam 8 directed from the laser head 7 to the seal point 9, shown in the figure with a single arrow, hits the board layer 4, where it is scattered into different directions without damage to the board. A sufficient portion of the beam 8 penetrates the board layer and is absorbed into the pigment contained in the plastic coating layers 5, 5', the pigment being heated and the coating plastic at the seal point 9 melting under this heat. The coating plastic may be e.g. polyethene (PE), polypropene (PP) or polyethylene terephtalate (PET) commonly used for extruded heat-seal coatings. A variety of other plastics are applicable, e.g. ABS, CA, COC, EVA, HIPS, PA, PC, PEEK, PEI, PEN, PETG, PMMA, PPO, PS, PVC, PVDF, POM, PSU and PU. The melted plastic layers 5, 5' are fused together, forming a tight seal between the edges of the sheet 1 when solidifying.

Figure 3:
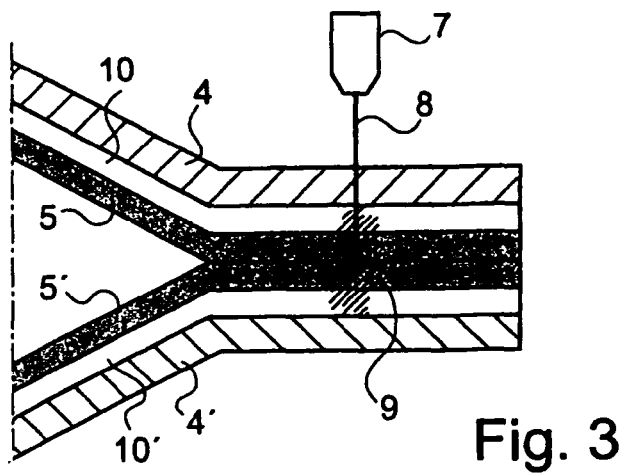

In the embodiment of FIG. 3, the board 4 is equipped with an inner transparent coating layer 10 and an outer pigmented coating layer 5. The transparent layer 10 may consist e.g. of ethylene vinyl alcohol polymer (EVOH) or polyamide (PA), which allow for an oxygen, aromatic and/or water vapour barrier shielding the packaged product, and the pigmented layer 5 may be similar to the one illustrated in FIG. 2. When the transparent layer 10 is pervious to the wavelength of the diode laser mentioned above, the pigmented layers 5, 5' will be sealed together in the manner described above.

The coated board in FIG. 4 differs from the one of FIG. 2 in that the pigmented plastic forms an inner coating layer 5, onto which a thin transparent coating layer 11 has been applied. The pigmented layer 5 and the transparent layer 11 may both contain polyethene as the coating plastic. The laser beam 8 penetrating through the board 4 is mainly absorbed into the inner pigmented coating layer 5, however, the absorption heat thus generated suffices for melting also the transparent plastic layers 11, 11' so that they seal together.

In FIG. 5 the edges 2, 3 of a board sheet, which is a board 4 equipped with a pigmented plastic coating 5 corresponding to FIG. 2, have been disposed overlapping with a view to sealing. This sealing manner is applicable e.g. in the manufacture of casing or container packages. The laser beam 8 is directed to the seal point from the outside of the package, and the sealing is based on the effect of the laser beam penetrating through the board 4, resulting in heating of the pigmented layer 5 and melting of the coating plastic. When solidified, the coating plastic, e.g. polyethene, adheres to the uncoated board surface, generating a seal that closes the side of the package. If desired, the board 4 can be equipped with a transparent plastic layer made of e.g. polyethene, which will form the outer surface of the package, and then the sealing takes place between the two coating layers containing polyethene.

In the embodiment of FIG. 6, sealing is performed on a board 4 equipped with a transparent plastic coating layer 12. With a view to sealing, a pigment 13 absorbing radiation has been disposed between the facing coating layers 12, 12'. The pigment may be contained e.g. in printing ink applied onto the transparent layer 12. The laser beam 8 penetrates through the transparent layer 12, thus heating the pigment 13, resulting in the coating layers 12, 12' melting and being sealed together.

FIGS. 7 and 8 are examples of the sealing of a plastic-coated board and a plastic film 14 placed against this. In FIG. 7, the plastic coating 5 of the board 4 is pigmented, while the plastic film 14 to be sealed to the pigmented layer is transparent. The sealing is based on the effect of the laser beam 8 having penetrated through the board 4, resulting in heating of the pigment and fusion of the plastic layers 5, 14 to each other. In FIG. 8, the plastic coating 12 of the board 4 is also transparent, and to achieve sealing, an absorptive pigment, e.g. a component in printing ink, has been disposed between the board 4 and the transparent coating layer 12. The effect of the pigment 13 heated under the laser beam 8, which results in melting of the plastic in the transparent layers 12, 14, suffices for fusion of the layers to each other.

The embodiments shown in FIGS. 9 and 10 relate to the sealing of uncoated board 4 to a plastic film disposed adjacent the board. In FIG. 9, the absorptive pigment generating the sealing is dispersed in the plastic film 15, and in FIG. 10 the pigment 13 is disposed between the board 4 and the transparent plastic film 14 to be sealed to the board. The pigment 13 may be contained in printing ink applied in advance either onto the board 4 or the plastic film 14.

EXAMPLES

The invention was tested by sealing plastic-coated packaging board sheets to themselves using the technique of FIG. 1, with the plastic-coated sides of the sheet adjacent each other.

The laser head consisted of a diode laser having a wavelength of 940±10 nm, a power of 90 W, a focus point distance of 5 mm from the board surface and a speed of movement along the sealing line of 20-75 mm/s. The following is a list of the test materials and their layer weights together with the laser head speeds for the materials with which the sealing was successful:
1. Board Natura Barr Silver (Stora Enso), board (300 g/m$^2$)+PE (58 g/m$^2$), containing 12% of TiO$_2$ and 0.15% of carbon black,
    laser head speed 60-75 mm/s,
2. Board Performa (Stora Enso) (210 g/m$^2$)+PET (40 g/m$^2$), containing 2% of carbon black,
    laser head speed 70 mm/s,
3. Board Trayforma (Stora Enso) (350 g/m$^2$)+PET (40 g/m$^2$), containing 12% of TiO$_2$,
4. Trayforma (315 g/m$^2$)+PE (40 g/m$^2$),
5. Trayforma (250 g/m$^2$)+PET (40 g/m$^2$),
6. Trayforma (250 g/m$^2$)+PP (20 g/m$^2$),
7. Trayforma (315 g/m$^2$)+PE (40 g/m$^2$), having black Indian ink on the surface,
    laser head speed 20-25 mm/s,
8. Trayforma (250 g/m$^2$)+PET (40 g/m$^2$), having black Indian ink on the surface,
    laser head speed 50-80 mm/s,
9. Trayforma (250 g/m$^2$)+PP (20 g/m$^2$), having black Indian ink on the surface,
    laser head speed 50 mm/s,
10. Trayforma (350 g/m$^2$), having black printing ink on the surface+PET (40 g/m$^2$),
    laser head speed 60-70 mm/s,
11. Trayforma (420 g/m$^2$), having red printing ink on the surface+PE (20 g/m$^2$),
    laser head speed 70 mm/s,
12. Trayforma (420 g/m$^2$), having blue printing ink on the surface+PE (20 g/m$^2$),
    laser head speed 70 mm/s,
13. Trayforma (410 g/m$^2$), having orange printing ink on the surface+PE (20 g/m$^2$).

In the trials, sealing occurred with samples 1-2 and 7-12. With samples 3-6 and 13, no seal was formed or adhesion was inadequate. No burning of the board during sealing was observed.

The results indicate that sealing by means of a laser beam penetrating through the fibre layer of the board is feasible if the pigment is admixed with the coating plastic, if the pigment is applied onto the surface of the plastic layer or if the pigment is disposed on the surface of the board under the plastic coating. In addition to black pigment, a successful result was achieved also with red and blue pigment. The result is nevertheless dependent of the test conditions, such as the wavelength of the laser beam used.

It is obvious to those skilled in the art that the applications of the invention are not restricted to the examples given above, but may vary within the scope of the accompanying claims. Thus, for instance, the diode laser head can be replaced with an Nd:YAG laser on a wavelength of 1064 nm.

The invention claimed is:

1. A method for sealing a polymer-coated fibre-based material to a counter-surface, comprising:
    providing a multilayer polymer coating disposed on a fibre layer of the material with a radiation-absorbing light-shielding pigment dispersed in an inner polymer coating layer adjacent to a transparent outer polymer coating layer, said pigment being dispersed over the entire area of said inner polymer coating layer,
    selecting a sealing area as a portion of the area of said fibre-based material with the pigmented coating,
    directing a laser beam of wavelength not greater than 1500 nm from a diode or Nd:YAG laser source to said fibre layer of the material, said fibre layer having a weight of 210-420 g/m$^2$, a first part of the laser beam being scattered within said fibre layer and a second part of the laser beam passing through said fibre layer to reach said pigmented inner polymer coating layer and be absorbed by the radiation-absorbing pigment present at said sealing area adjacent to said counter surface, wherein
    said second part of the laser beam absorbed by the pigment heat-melts polymer of said pigmented inner polymer coating layer and said transparent outer polymer coating layer present at the sealing area and seals the polymer-coated fibre-based material to said counter-surface.

2. A method as defined in claim 1, wherein the polymer-coated fibre-based material is a polymer-coated paper or board which is sealed to an adjacent polymer layer.

3. A method as defined in claim 2, wherein the polymer-coated paper or board is sealed against itself.

4. A method as defined in claim 3, wherein the method is used for lateral sealing or closing of casing, container or bag packages made of polymer-coated paper or board.

5. A method as defined in claim 1, wherein the polymer-coated fibre-based material is a polymer-coated paper or board, and
    the polymer-coated paper or board is sealed to said counter-surface placed adjacent to said polymer coating.

6. A method as defined in claim 5, wherein the laser source of the laser beam is a Nd:YAG laser.

7. A method as defined in claim 1, wherein the pigment is included in a member forming the counter-surface, to which the fibre-based material is to be sealed.

8. A method as defined in claim 1, wherein the pigment contains carbon black.

9. A method as defined in claim 1, wherein the laser source of the laser beam is a diode.

10. A method as defined in claim 1, wherein the laser source of the laser beam is a Nd:YAG laser.

11. A method as defined in claim 1, wherein the laser beam has a wavelength of 500-1500 nm.

* * * * *